E. H. BELDEN.
TIRE CARRIER.
APPLICATION FILED JULY 30, 1919.
1,404,003.
Patented Jan. 17, 1922.
2 SHEETS—SHEET 1.
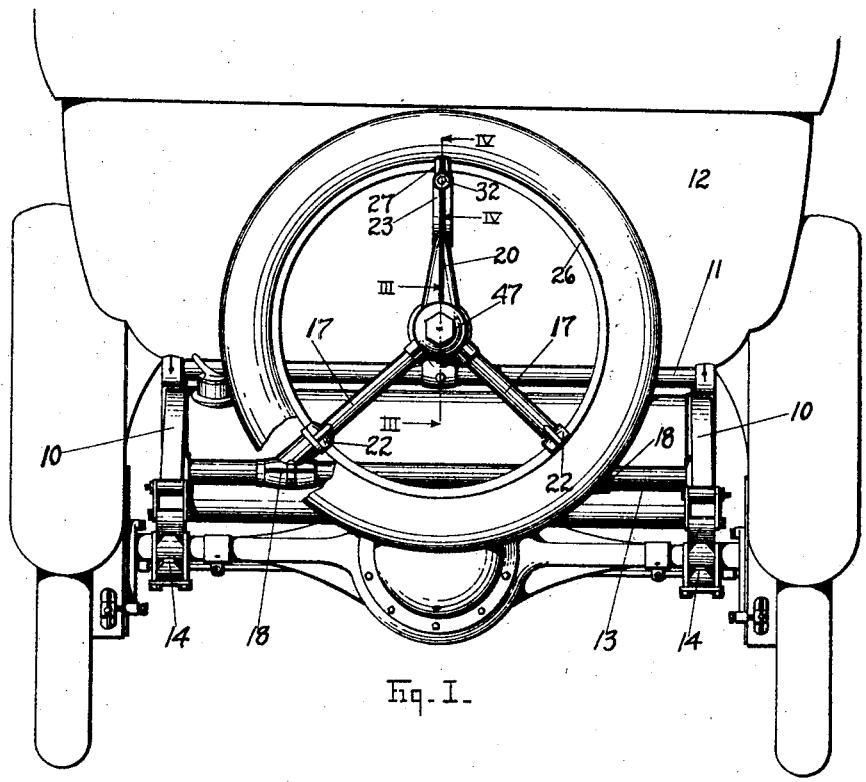
Fig. I.
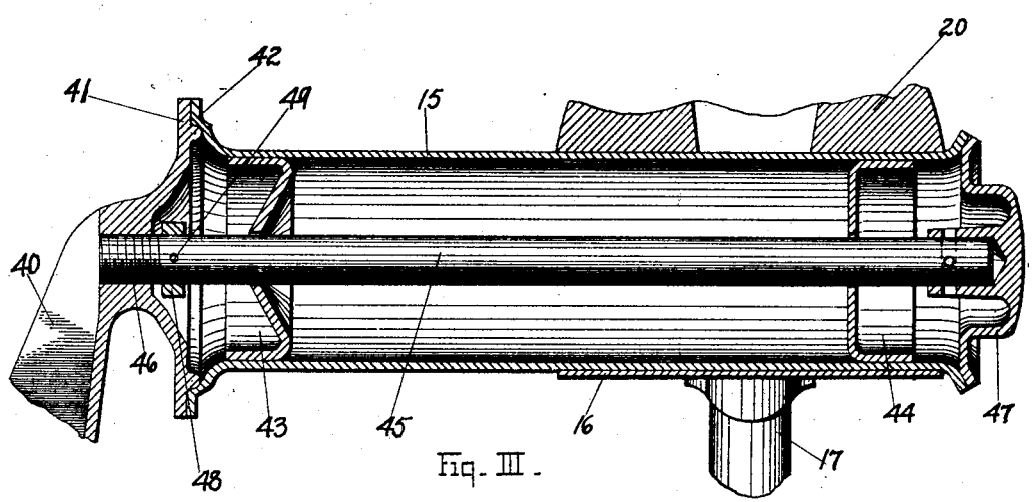
Fig. III.
INVENTOR.
Edward H. Belden.
BY Chester H. Braselton
ATTORNEY E. H. BELDEN.
TIRE CARRIER.
APPLICATION FILED JULY 30, 1919.
1,404,003.
Patented Jan. 17, 1922.
2 SHEETS—SHEET 2.
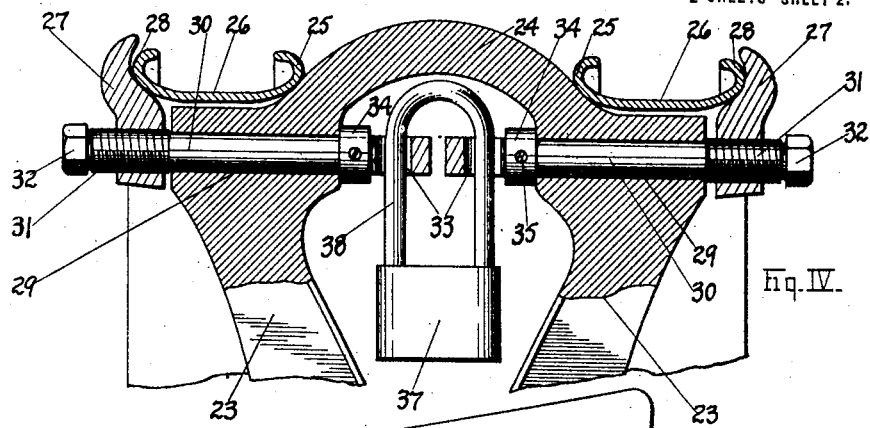
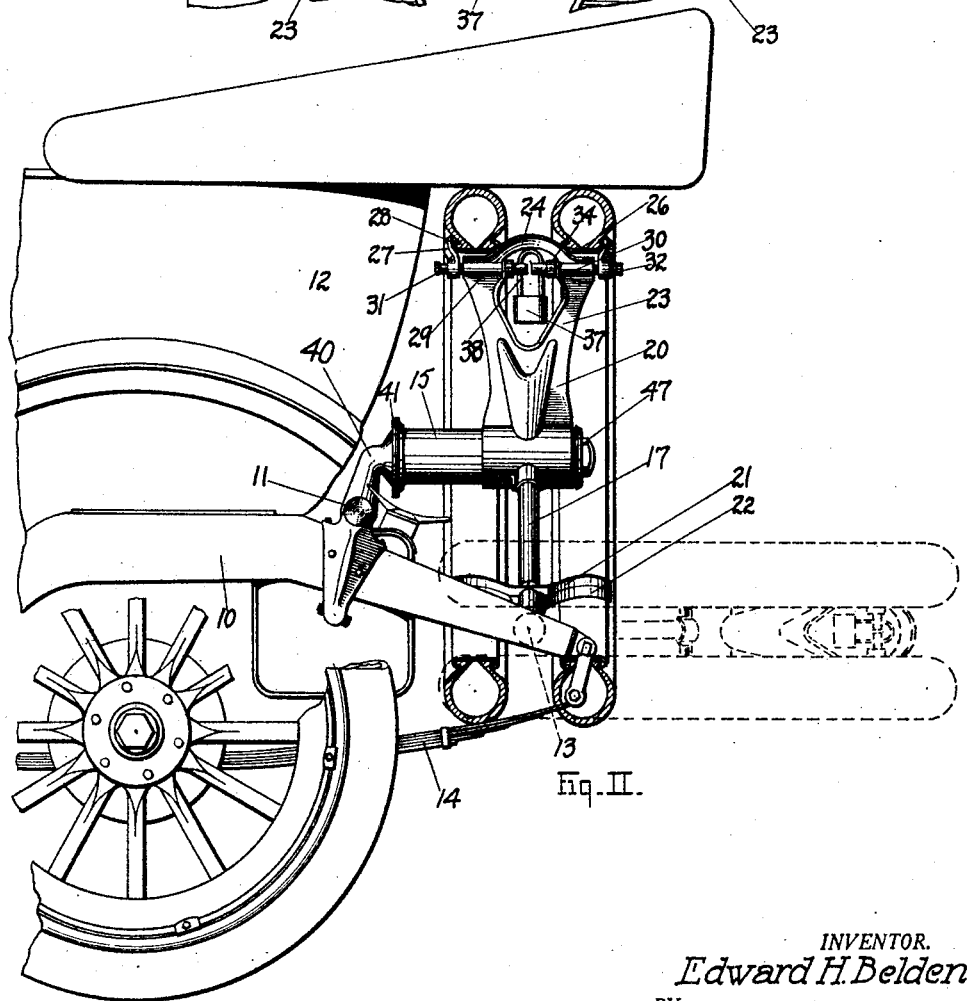
INVENTOR.
Edward H. Belden.
BY Chester W. Braselton
ATTORNEY.

UNITED STATES PATENT OFFICE.

EDWARD H. BELDEN, OF TOLEDO, OHIO.

TIRE CARRIER.

1,404,003.   Specification of Letters Patent.   Patented Jan. 17, 1922.

Application filed July 30, 1919. Serial No. 314,342.

*To all whom it may concern:*

Be it known that I, EDWARD H. BELDEN, residing at Toledo, county of Lucas, State of Ohio, have invented certain new and useful Improvements in Tire Carriers, of which I declare the following to be a full, clear, and exact description.

This invention relates to improvements in tire carriers, particularly to carriers of the type which are secured to the rear end portion of an automobile frame.

One object of the invention is to provide a device of this character which is of simple construction and efficient in operation.

A further object of the invention is to provide improved fastening means for securing a pivoted carrier of the type illustrated herewith in upright or substantially upright position relative to the automobile frame.

A further object of the invention is to provide a tire carrier of this character having improved means for retaining a demountable rim in position thereon.

Further objects of this invention relate to economies of manufacture and details of construction as will appear from the detailed description to follow.

The objects of the invention are accomplished by the devices and means described in the following specification, and illustrated in the accompanying drawings, wherein:

Figure I is a rear elevational view of the rear end portion of an automobile illustrating the position of the carrier when the same is retained in upright position relative to the automobile frame.

Figure II is a side elevational view illustrating the position of the carrier in full lines when the same is retained in its upright position relative to the automobile frame, and showing the position of the carrier in dotted lines when the same is being rotated about its pivot point as a center into an inclined position in contact with the ground.

Figure III is a detail sectional view, taken along the line III—III of Figure I, and illustrating the mechanism employed for retaining the carrier in upright position relative to the automobile frame.

Figure IV is a detail sectional view, taken along the line IV—IV of Figure I, and illustrating the means employed for securing the demountable rim in position upon the carrier.

In the embodiment of the invention illustrated herewith, 10 indicates the rearwardly extending side frame members of an automobile which are rigidly connected together by means of a cross bar 11 extending therebetween and secured to the rearwardly extending frame members at points near the rearward portion of the body 12. A brace rod 13 connects the rearwardly extending end portions of the frame members 10, being connected thereto adjacent the points of connection of the frame members to the springs 14.

The main body portion of the tire carrier comprises a tubular portion 15, the axis of which is substantially parallel with the axes of the demountable rims when the rims are positioned upon the carrier, and the tubular member is partially surrounded by a sleeve 16 to which are firmly secured a pair of downwardly extending members 17, the lower end portions of which are firmly secured to sleeves 18 rotatably mounted upon the brace rod 13 to permit the main body portion of the carrier to pivot about the brace rod as a center whereby the same is capable of occupying a vertical position relative to the automobile frame as illustrated in full lines in Figure II, or to swing about the rod 13 into an inclined position in contact with the ground, the carrier being shown partially turned into this position in dotted lines in Figure II. An upwardly extending arm 20 is firmly secured to or formed integral with the sleeve 16, and extends upwardly from the tubular portion 15 of the carrier. A member 21 is secured to each of the downwardly extending rods 17 at a point adjacent the lower end thereof each of the members 21 being provided with a curved portion 22 adjacent the end thereof which is adapted to form a seat for the reception of a portion of a wheel rim. The arm 20 as it extends upwardly divides to form a pair of branches 23 which extend outwardly from each other and are connected adjacent their upper ends by a raised web portion 24, the sides of which serve as stops for engaging the edges 25 of a pair of demountable rims 26 when said rims are positioned within the recessed portions 22 of the members 21 and forced against the upper surface of the web. Flanged members 27 are provided for engaging the outer edges 28 of the rims when they are thus positioned upon the carrier and suitable means are provided for clamping the flanged members 27 into close engagement with the edges 28 of the rims to retain the same in position upon the carrier until such time as their removal is desired.

The means employed for clamping the flanged members into close contact with the outer edges of the rims comprises mechanism which will now be described. Oppositely positioned aligned openings 29 are formed in the branches 23 adjacent the upper end portion thereof, within each of which openings is rotatably mounted a rod 30 provided with a threaded portion 31 adjacent one end thereof and an enlarged angular portion 32 located outwardly from the threaded portion 31. The inner end portion of each of these rods is provided with transverse openings 33 formed therein, and when the rods are positioned within the openings 29 formed in the branches 23 within which openings they are inserted from the outer side faces of the branches, each of these rods is provided with a collar 34 secured to the rod adjacent the inner end thereof by means of a set screw 35. It will be understood from the above description that the collar 34 permits rotation of the rods 30 while preventing the same from moving outwardly relative to the supporting arm. Each of these rods is capable of being rotated by means of a wrench or other suitable means applied to the angular portion 32 whereby the flanged member 27 being properly positioned against the outer edge of the demountable rim is drawn into close engagement with the rim to clamp the same against the raised portion of the web. The rods 30 are each provided with a right handed thread formed upon the threaded portion 31 thereof, whereby both of the rods cannot be rotated in the same direction to release the flanged members 27 from engagement with their corresponding rims. A padlock 37 is provided for retaining the two rods against rotation after the flanged members 27 have been drawn into engagement with the edges of the rims, the said padlock comprises a U-shaped member 38, the branches of which are inserted within the openings 33 formed in the inner ends of the rods whereby rotation of either rod is prevented and both rims securely locked against removal from the carrier.

An angular arm 40 is firmly secured to the cross bar 11 and extends upwardly therefrom, the said arm being provided with a boss 41 formed at the upper end thereof for engagement with an outwardly extending flange 42 formed upon the inner end of the tubular member 15. A pair of sleeves 43 and 44 are positioned within the tubular member 15, each of said sleeves being provided with a central opening adapted to receive a rod 45 which is provided with a threaded portion 46 at one end thereof and an angular cap 47 is firmly secured to the opposite end of the rod 45 in any suitable or desired manner. A collar 48 is secured to the rod 45 adjacent the inner end thereof by means of suitable fastening devices such as a pin 49, the said collar serving to prevent the removal of the rod from the tubular member through the central openings formed in the sleeves 43 and 44. When the carrier is rotated about the rod 13 as a pivot so as to be positioned in upright position relative to the vehicle body the rod 45 may be rotated through the cap 47 so that the threaded end portion 46 will be threaded within a suitably formed internally threaded opening provided in the boss 41 whereby the carrier is firmly secured and retained in its normally upright position. When it is desired to lower the carrier into an inclined position, the rod 45 may be rotated in the manner previously described to disengage the threaded end portion 46 from the threaded opening formed in the boss whereby the carrier may be permitted to swing about its pivot point into the dotted line position illustrated in Figure II.

While the type of carrier to which this structure particularly relates is one in which the main portion of the carrier is pivotally mounted to the rear end portion of the automobile frame so as to be capable of pivotal movement about a fixed point as a center, it is to be understood that the particular features to which the claims of this application are directed are adapted to be employed in connection with any of the ordinary forms of tire carriers whether pivotally mounted upon the frame or secured in fixed relation relative thereto.

While I have shown and described in considerable detail a specific embodiment of my invention, it is to be understood that this showing and description is illustrative only and for the purpose of rendering my invention more clear, and that I do not regard the invention as limited to the details of construction illustrated or described, except in so far as I have included such limitations within the terms of the following claims in which it is my intention to claim all novelty inherent in my invention broadly as well as specifically.

What I claim as new and desire to secure by Letters Patent is:

1. In combination with an automobile frame, a tire carrier pivotally mounted upon said frame and provided with a central tubular member, a boss carried by the frame and mounted for engagement with one end of the tubular member, and a bolt non-removably carried by the tubular member and engageable with the boss for retaining the carrier in upright position.

2. In combination with an automobile frame, a tire carrier pivotally mounted upon said frame and provided with a central tubular member having a sleeve therein provided with a central opening, a boss carried by the frame and mounted for engagement with one end of the tubular member, and a bolt carried by the tubular member and extending through the central opening in said sleeve, the bolt being engageable with the boss for retaining the carrier in upright position and having means thereon for normally preventing its removal from the sleeve.

3. In a device of the class described, supporting members for engaging the flanges of wheel rims, an arm provided with a head having a portion against which one flange of each rim is adapted to abut, flanged members for engaging the other side edge of each rim, rotatable members for clamping the flanged members against the rim and common locking means for locking the rotatable members against rotation.

4. In a device of the class described, a support for wheel rims having a portion against which one flange of each rim is adapted to abut, flanged members for engaging the other side edge of each rim, reversely rotatable members for clamping the flanged members against the rim, and means for locking the rotatable members together against rotation.

5. In a device of the class described, a support for wheel rims having a portion against which one flange of each rim is adapted to abut, flanged members for engaging the other side edge of each rim, rotatable members for clamping the flanged members against the rim, and common locking means for locking the rotatable members against rotation.

6. In a tire carrier, a support for wheel rims having a recessed portion for receiving said rims, an arm on said carrier having an abutment against which one edge of each rim is adapted to abut, flanged members for engaging the opposite edges of said rims, oppositely rotatable members for clamping the flanged members against the rim, and means for locking the rotatable members together against rotation.

7. In a tire carrier, means for supporting a pair of wheel rims side by side, said means comprising inner inclined surfaces against which the inner edges of the rims are adapted to abut, flanged members for engaging the opposite edges of the rim, separate bolts adapted when rotated in opposite directions to press said flanged members against said rims, the inner ends of said bolts being perforated, and locking means adapted to extend through said perforations.

In testimony whereof, I affix my signature.

EDWARD H. BELDEN.

Certificate of Correction.

It is hereby certified that Letters Patent No. 1,404,003, granted January 17, 1922, upon the application of Edward H. Belden, of Toledo, Ohio, for an improvement in "Tire Carriers," were erroneously issued to the inventor, said Belden, whereas said Letters Patent should have been issued to *The Willys-Overland Company, of Toledo, Ohio, a Corporation of Ohio*, said corporation being assignee of the entire interest in said invention, as shown by the records of assignments in this office; and that the said Letters Patent should be read with this correction therein that the same may conform to the record of the case in the Patent Office.

Signed and sealed this 24th day of April, A. D., 1922.

[SEAL.]                                    KARL FENNING,
*Acting Commissioner of Patents.*